United States Patent
Jensen

(10) Patent No.: US 6,345,084 B1
(45) Date of Patent: Feb. 5, 2002

(54) APPARATUS AND METHODS FOR REPLACING A CORE SPRAY T-BOX/ THERMAL SLEEVE IN A NUCLEAR REACTOR

(75) Inventor: Grant C. Jensen, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/443,374

(22) Filed: Nov. 19, 1999

(51) Int. Cl.[7] .......................... G21C 15/00; G21C 19/00
(52) U.S. Cl. ...................... 376/352; 376/204; 376/282; 376/292; 138/89; 138/97
(58) Field of Search ................................. 376/282, 352, 376/203–205; 285/322, 331, 323; 138/89, 97

(56) References Cited

U.S. PATENT DOCUMENTS

| | | | | |
|---|---|---|---|---|
| 3,138,534 A | * | 6/1964 | Frisch et al. ................. 376/352 |
| 3,383,287 A | * | 5/1968 | Jackson ....................... 376/352 |
| 3,613,936 A | * | 10/1971 | Kaiser et al. ............... 220/24.5 |
| 3,895,831 A | * | 7/1975 | Fisher .......................... 285/93 |
| 4,032,398 A | * | 6/1977 | Cross et al. .................. 376/352 |
| 4,168,071 A | * | 9/1979 | Jacobson et al. ............. 277/22 |
| 4,198,272 A | * | 4/1980 | Salmon ........................ 376/203 |
| 4,285,770 A | * | 8/1981 | Chi et al. ...................... 176/65 |
| 4,356,147 A | * | 10/1982 | Borrman et al. ............ 376/291 |
| 4,369,893 A | * | 1/1983 | Pennell et al. ............... 220/378 |
| 4,576,400 A | * | 3/1986 | Allred et al. .................... 285/5 |
| 4,693,389 A | * | 9/1987 | Kalen .......................... 220/236 |
| 4,834,935 A | * | 5/1989 | Daigle et al. ................ 376/292 |
| 5,345,484 A | * | 9/1994 | Deaver et al. ............... 376/407 |
| 5,737,380 A | * | 4/1998 | Deaver et al. ............... 376/352 |
| 5,785,361 A | * | 7/1998 | Bourbour et al. ............ 285/382 |
| 5,839,192 A | * | 11/1998 | Weems et al. .......... 29/890.031 |
| 5,901,192 A | * | 5/1999 | Deaver et al. ............... 376/282 |
| 5,912,936 A | * | 6/1999 | Charnley et al. ............ 376/282 |
| 5,918,911 A | * | 7/1999 | Sims ............................. 285/13 |
| 5,947,529 A | * | 9/1999 | Jensen ...................... 285/123.6 |
| 6,201,847 B1 | * | 3/2001 | Jensen et al. ................ 376/352 |

FOREIGN PATENT DOCUMENTS

DE                 2829590          * 1/1980   .................. 376/352

* cited by examiner

Primary Examiner—Michael J. Carone
Assistant Examiner—Jack Keith
(74) Attorney, Agent, or Firm—Nixon & Vanderhye

(57) ABSTRACT

A T-box/thermal sleeve assembly replaces a damaged T-box/ thermal sleeve in a core spray nozzle of a nuclear reactor. To replace the parts, the T-box and a portion of the extant thermal sleeve are removed from a location within the reactor vessel wall. The end of the thermal sleeve remnant is smoothed and a groove is formed along its interior surface. A replacement T-box/thermal sleeve and collet assembly are inserted into the nozzle bore from the interior of the vessel wall. The collet has axially projecting fingers with radial flanges for engaging in the groove to form a mechanical connection between the thermal sleeve remnant and the T-box/thermal sleeve replacement. A Belleville spring washer is interposed between the assembly and thermal sleeve remnant to place both parts in compression. A retention sleeve is screwthreaded within the replacement thermal sleeve to lock the fingers from radial movement. Adjustable wedge blocks are mounted about the replacement T-box/thermal sleeve to axially align the replacement assembly with the thermal sleeve remnant.

8 Claims, 5 Drawing Sheets

APPARATUS AND METHODS FOR REPLACING A CORE SPRAY T-BOX/THERMAL SLEEVE IN A NUCLEAR REACTOR

BACKGROUND OF THE INVENTION

The present invention relates to apparatus and methods for replacing a core spray T-box and thermal sleeve forming part of a core spray system in a nuclear reactor and particularly relates to the replacement of the T-box and a portion of the thermal sleeve from within the reactor vessel.

In a typical boiling water nuclear reactor, a core spray system is provided to prevent excessive fuel clad temperature in the event of a loss of coolant accident by delivering cooling water to the core region of the reactor. A core spray system conventionally includes a core spray pump for pumping water through an external piping system in communication with a nozzle which penetrates the reactor vessel wall. Within the reactor vessel, the nozzle encompasses a thermal sleeve which terminates in a T-connection or T-box for delivery of the cooling water via an internal piping and nozzle system to the nuclear core. A pair of redundant systems are typically employed, each including a core spray nozzle having a nozzle bore penetrating the vessel wall and a nozzle safe end outside of the vessel wall for connection with the core spray piping external to the reactor vessel wall. On the interior side of the vessel wall, there is a T-box which is welded to the thermal sleeve within the nozzle bore and which sleeve is, in turn, welded to the nozzle safe end.

These welded joints are susceptible to cracking. In the event one or more of the welds crack, the integrity of the vessel wall is compromised. While it is possible to remove the safe end of the nozzle from a location outside the reactor vessel wall, substantial and unacceptable downtime and expense would be necessary to accomplish that task because external removal of the safe end invariably necessitates draining the reactor vessel. Consequently, there is a need to provide a simple, reliable connection between internal piping of the core spray system and the safe end of the nozzle which can be used to replace the T-box and thermal sleeve without removing and replacing the associated safe end thereby maintaining the integrity of the reactor vessel wall.

BRIEF SUMMARY OF THE INVENTION

In accordance with a preferred embodiment of the present invention, there is provided apparatus and methods of mechanically attaching a replacement T-box and a thermal sleeve portion to an existing core spray nozzle safe end from within the reactor vessel. To accomplish the foregoing, and from within the reactor vessel wall, the existing, i.e., extant T-box and a portion of the thermal sleeve are first removed from the core spray nozzle. This can be accomplished by conventional underwater electric discharge machining (E.D.M.). Once the extant thermal sleeve portion is removed, the newly cut end of the thermal sleeve remnant is machined flat and perpendicular to the nozzle bore so that it will mate with a replacement assembly comprised of a combined T-box/thermal sleeve. An annular groove is also machined in the remnant end of the thermal sleeve, preferably along the inside diameter of the thermal sleeve remnant. The replacement T-box/thermal sleeve assembly is then inserted into the nozzle bore for mechanical securement with the thermal sleeve remnant, the invention being accomplished from within the reactor vessel.

A sealing washer, preferably a Belleville washer, is interposed between abutting ends of the replacement thermal sleeve and the thermal sleeve remnant such that in final securement, the replacement thermal sleeve and thermal sleeve remnant are placed in compression. To mechanically secure the replacement T-box/thermal sleeve assembly in the nozzle bore, a collet having a plurality of circumferentially spaced fingers terminating in radially directed flanges is secured, preferably by thrusting, to the assembly at an end of the collet opposite the flanges. Thus, the replacement thermal sleeve is secured in the nozzle in a manner such that the extent of the collet fingers can be adjustable relative to the replacement thermal sleeve. For example, the collet may be screwthreaded to and within the replacement thermal sleeve. When the replacement T-box/thermal sleeve and washer are inserted into the nozzle bore, the collet flanges ride over the end portion of the thermal sleeve remnant to engage in the groove. By adjusting the collet and replacement thermal sleeve relative to one another, i.e., by screwthreading, the securement between the replacement thermal sleeve and the thermal sleeve remnant places the Belleville washer under compression, as well as portions of the replacement thermal sleeve and thermal sleeve remnant.

To secure the fingers with their flanges in the groove, a retention sleeve is also screwthreaded to the replacement thermal sleeve and extends to overlie the fingers, preventing, in final securement, radial movement of the flanges of the fingers in a direction, e.g., radial inward direction, away from the groove. Once the collet finger flanges are locked in the groove, the retention sleeve is staked to the replacement thermal sleeve to prevent its release through relative rotation.

Additionally, a plurality of adjustable wedges are located between the replacement thermal sleeve and the nozzle bore adjacent the interior wall surface of the reactor vessel. By adjusting the wedges, the replacement thermal sleeve is axially aligned within the nozzle bore. The wedges also support the weight of the replacement T-box/thermal sleeve assembly from the vessel wall, thereby minimizing bending stresses on the collet fingers. An end cover is then threaded onto the open end of the T-box housing compressing a second Belleville seal ring between the cap and housing. An anti-rotation feature, such as staking, can be employed to finally secure the cover and the T-box to one another.

In a preferred embodiment according to the present invention, there is provided in a nuclear reactor having a reactor vessel wall and a nozzle penetrating the wall for delivering a fluid into the reactor, the nozzle including an end portion of a sleeve within the nozzle and having a groove, a connection with piping internal to the reactor vessel, comprising a thermal sleeve extending from within the reactor vessel wall and having an end adjoining the sleeve end portion within the nozzle, a generally cylindrical collet having a plurality of circumferentially spaced fingers with radially directed flanges adjacent one end thereof, the flanges engaging in the groove, the collet being connected to the thermal sleeve adjacent an end thereof opposite one collet end and a retention sleeve secured to the thermal sleeve and extending about the fingers to retain the flanges in the groove.

In a further preferred embodiment according to the present invention, there is provided in a nuclear reactor having a reactor vessel wall and a nozzle penetrating the wall for delivery of a fluid within the reactor, the nozzle including a nozzle bore and a nozzle safe end having a thermal sleeve within the nozzle bore coupled to a fitting adjacent the interior of the vessel wall, a method of replacing the fitting and a portion of the thermal sleeve from within the reactor vessel wall, comprising the steps of removing the fitting and a portion of the thermal sleeve from within the nozzle leaving a thermal sleeve remnant within the nozzle, the step of removing being accomplished from the interior side of the reactor vessel wall, forming a groove in the thermal sleeve remnant within the nozzle bore, inserting into the nozzle bore from within the reactor vessel a replacement thermal sleeve, engaging an end portion of the replacement thermal sleeve with an end portion of the thermal sleeve remnant and engaging circumferentially spaced fingers of a collet secured to the replacement thermal sleeve in the groove to couple the replacement thermal sleeve and the extant thermal sleeve remnant to one another.

DETAILED DESCRIPTION OF THE INVENTION

Figure 1:
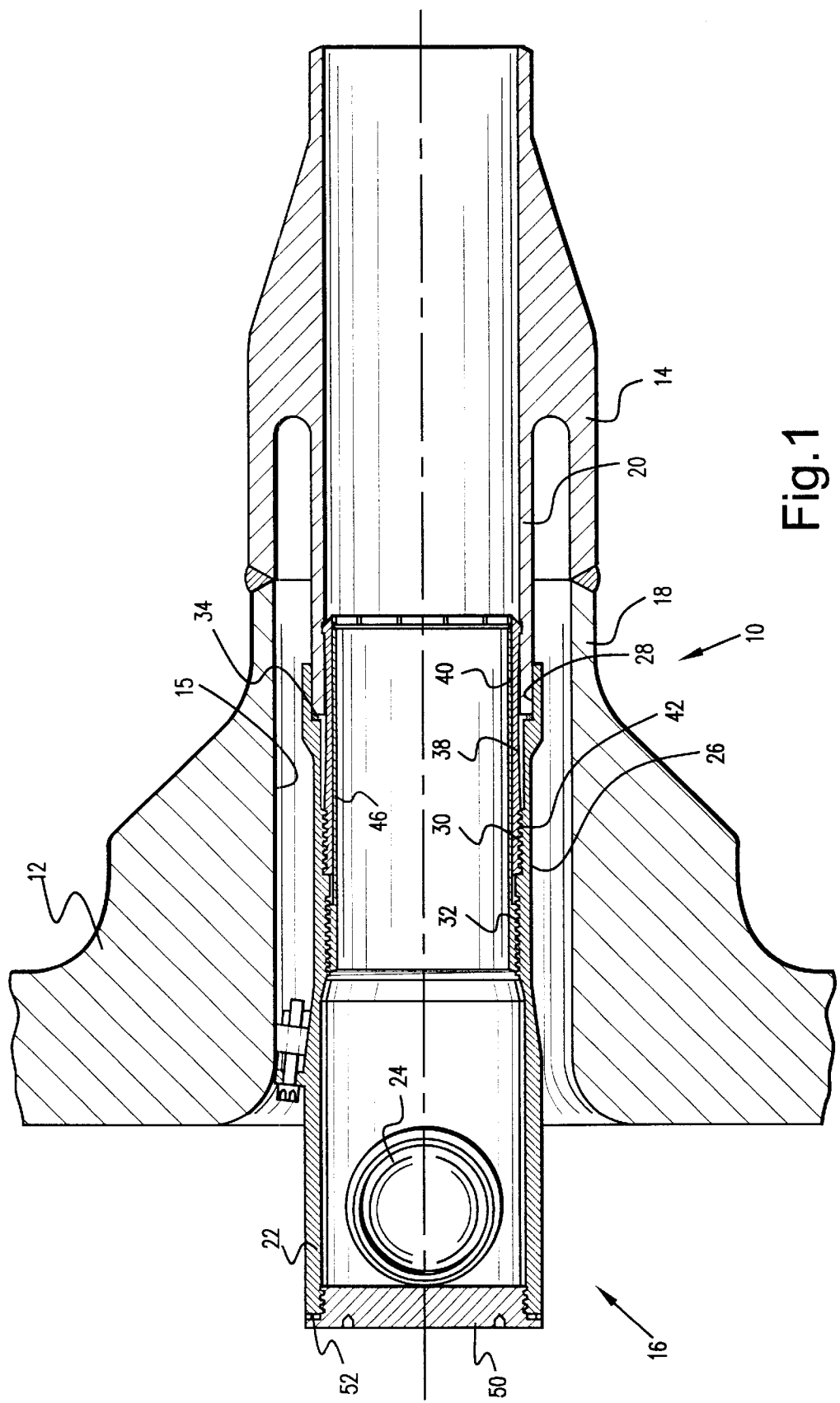
FIG. 1 is a fragmentary cross-sectional view of a replaced core spray T-box and thermal sleeve in the core spray nozzle in accordance with a preferred embodiment of the present invention.
Figure 2:
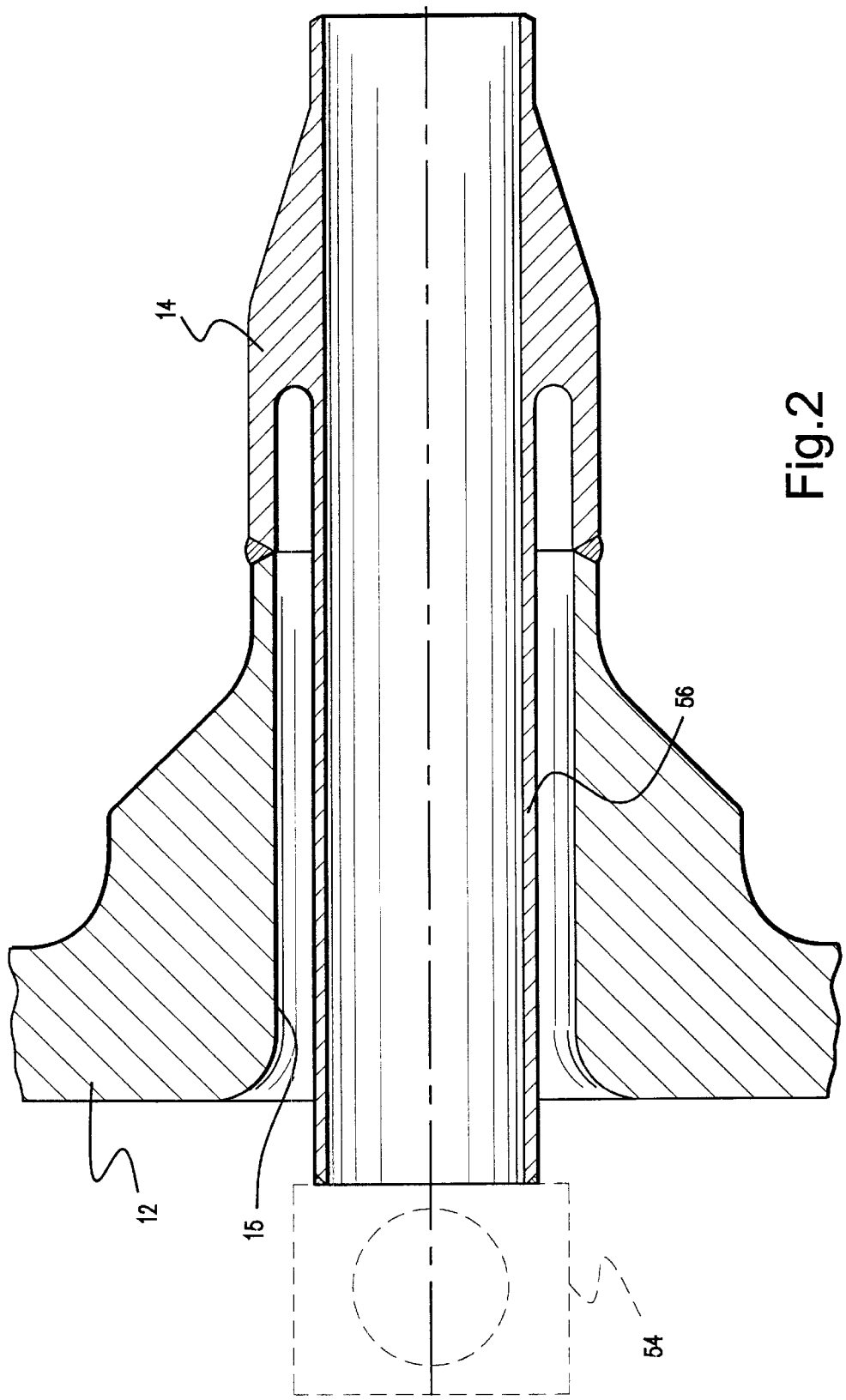
FIG. 2 is a view similar to FIG. 1 and illustrating the nozzle and thermal sleeve prior to replacement.

Referring now to the drawings, particularly to FIG. 1, there is illustrated a core spray nozzle, generally designated 10, for a nuclear reactor, the vessel wall of which is shown at 12. The core spray nozzle 10 of FIG. 1 illustrates the nozzle after replacement of the thermal sleeve portion previously employed to convey cooling water from the core spray piping external of the vessel through the nozzle safe end 14 and the vessel wall 12 to the core spray piping within the vessel wall. More particularly, the T-box 54 and thermal sleeve 56 as described below with reference to FIG. 2, are replaced by a T-box/thermal sleeve assembly 16 as illustrated in FIG. 1 from within the vessel wall. The replacement assembly is mechanically connected with the nozzle safe end 14 within the nozzle bore 15. As illustrated, the vessel wall 12 includes as part of the core spray nozzle 10 a laterally projecting pipe 18 to which the safe end 14 is welded. The safe end 14 includes a cylindrical pipe or thermal sleeve remnant 20 of the previously extant thermal sleeve in the nozzle 10.

Particularly, the T-box/thermal sleeve includes a T-junction or T-connection 22 which, in final assembly, lies adjacent the interior of the vessel wall 12. The T-box includes a pair of lateral passages 24 for connection with piping which extends about the interior of the vessel wall approximately 90° in opposite directions from the T-box. The piping, of course, connects the cooling water supplied through the core spray nozzle 10 to interior piping of the core spray system. The T-box 22 necks down to a smaller diameter replacement thermal sleeve 26 terminating at an outer end within the nozzle bore in a counterbore 28. The thermal sleeve 26 includes stepped diameter axially spaced threaded portions 30 and 32 along its interior wall surfaces. The thermal sleeve 26 is sized to receive the end portion of the thermal sleeve remnant 20 in the couterbore 28. A seal 34, preferably a Belleville washer, is disposed between the opposed ends of the replacement thermal sleeve 26 and the thermal sleeve remnant 20 such that the Belleville washer 34 is compressed, rendering portions of the thermal sleeve remnant 20 and the replacement thermal sleeve 26 in compression.

To retain the thermal sleeve 26 mechanically coupled to the thermal sleeve remnant 20, a groove 36 (FIGS. 3 and 4) is provided along the interior wall surface of the thermal sleeve remnant 20 spaced back from its end. A collet 38 comprising a cylindrical sleeve having a plurality of fingers 40 adjacent one end and an externally threaded portion 42 adjacent an opposite end is threaded along threads 30 within the replacement thermal sleeve 26. It will be appreciated that with radially directed flanges 44 on the ends of the fingers 40 engaged in groove 36, the T-box/thermal sleeve assembly 16 is maintained mechanically assembled to the thermal sleeve remnant 20.

To retain the fingers 40 with the flanges 44 engaged in the groove 36, a retention sleeve 46 externally threaded at one end is received within the collet 38. It will be appreciated by threading the retention sleeve 46 along the interior threads 32 of the replacement thermal sleeve 26, the opposite end of the retention sleeve 46 overlies the fingers 40, preventing the finger flanges 44 from removal within the groove 36. A cover 50 is also secured to the open end of the T-box 22 and a seal washer, preferably a Belleville spring washer 52, is disposed between the cover and the T-box end.

The collet 38 is preferably formed of Inconel. Inconel has a linear coefficient of expansion less than that of steel. The thermal sleeve remnant 20 and replacement thermal sleeve 26 are formed of steel. Accordingly, when the system heats up, the collet will not expand as much as the thermal sleeve remnant 20 and the replacement thermal sleeve 26. The Belleville washer 34 is also formed of Inconel. Therefore, at temperature, the Belleville washer 34 is placed under further compression desirably enhancing its sealing capability and providing thermal compliance at temperature by accommodating differences in thermal expansion between component materials.

Figure 3:
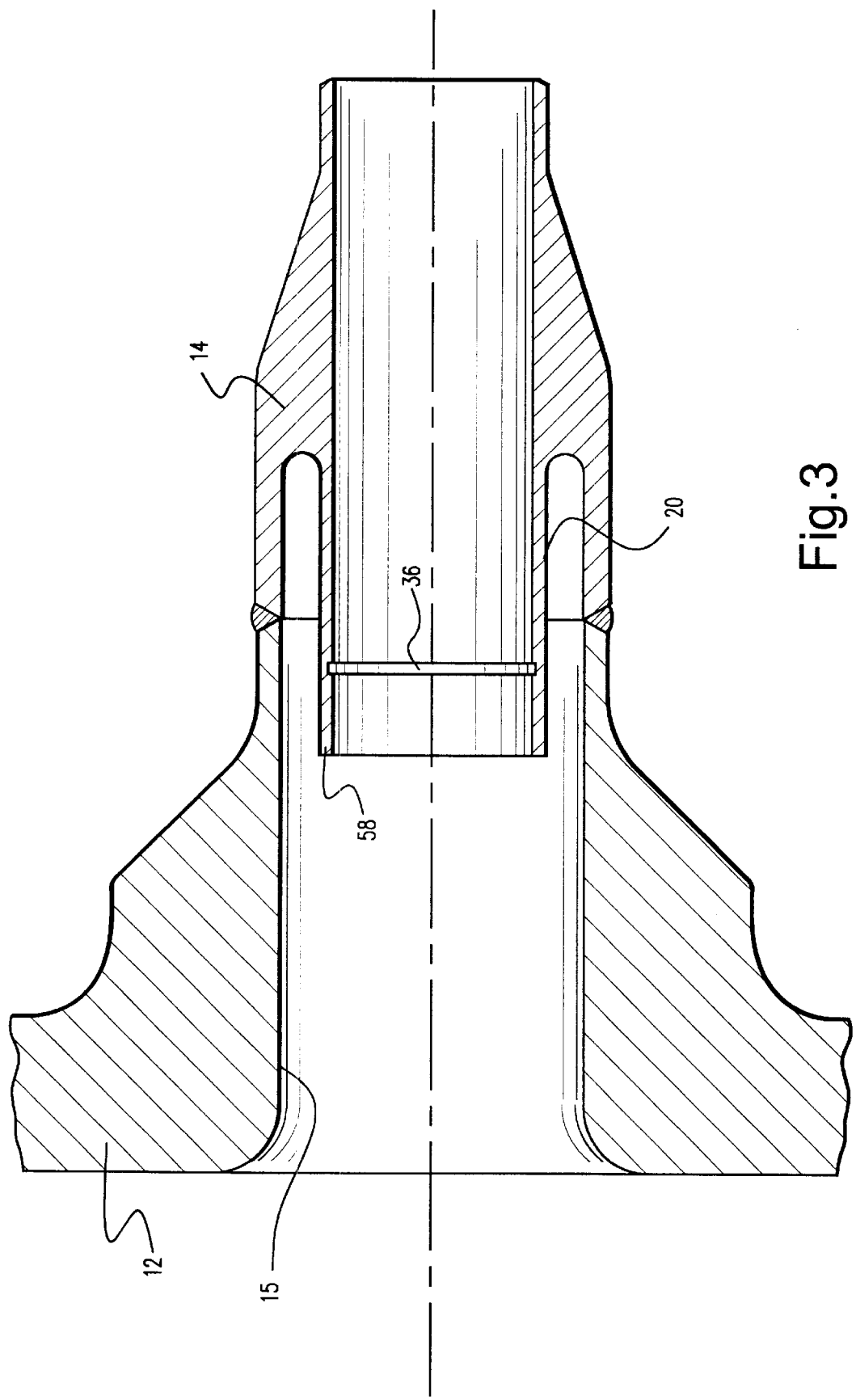
FIGS. 3–5 illustrate a sequence of steps for replacing the thermal sleeve of FIG. 2 with a replacement T-box and thermal sleeve assembly.
Figure 4:
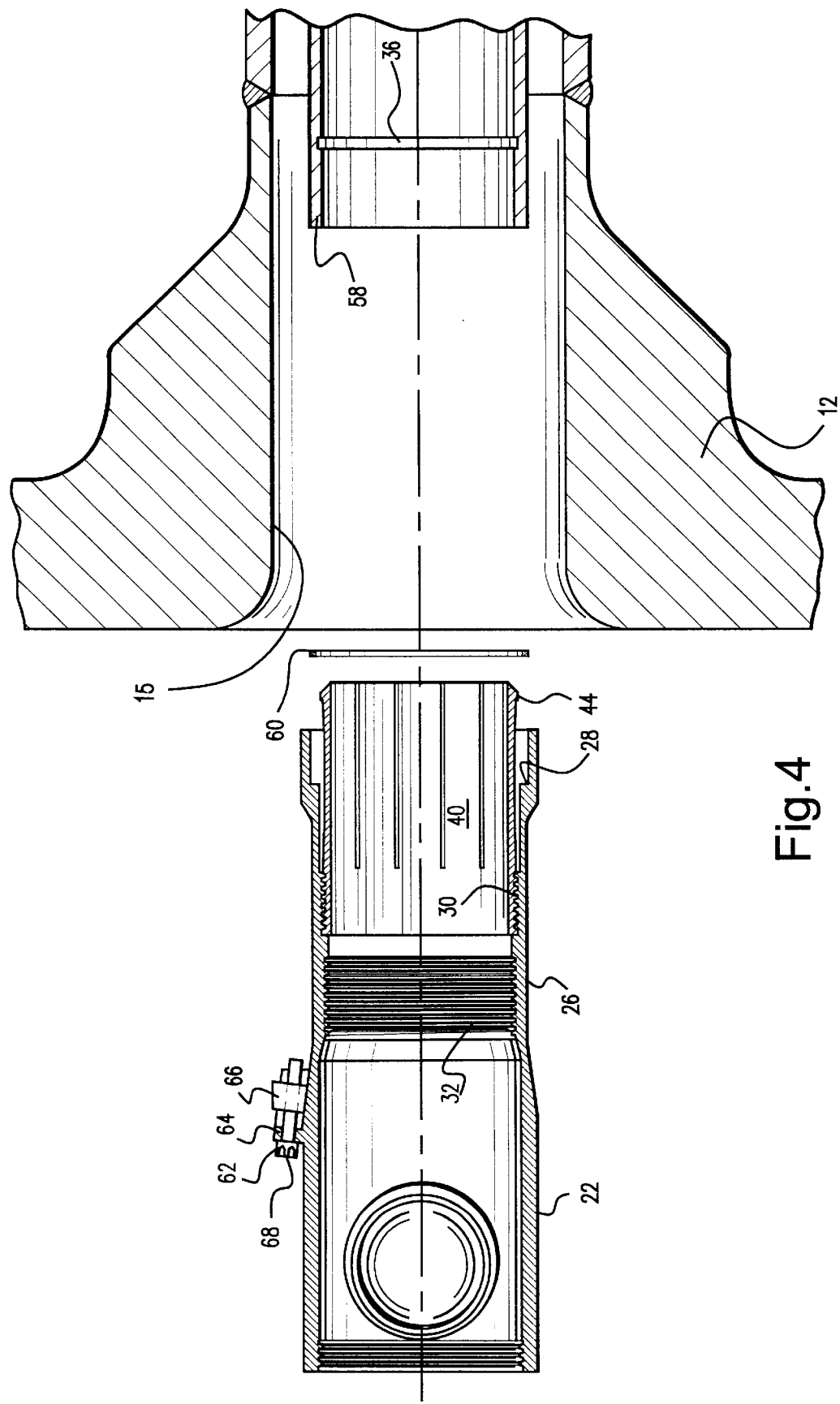
Figure 5:
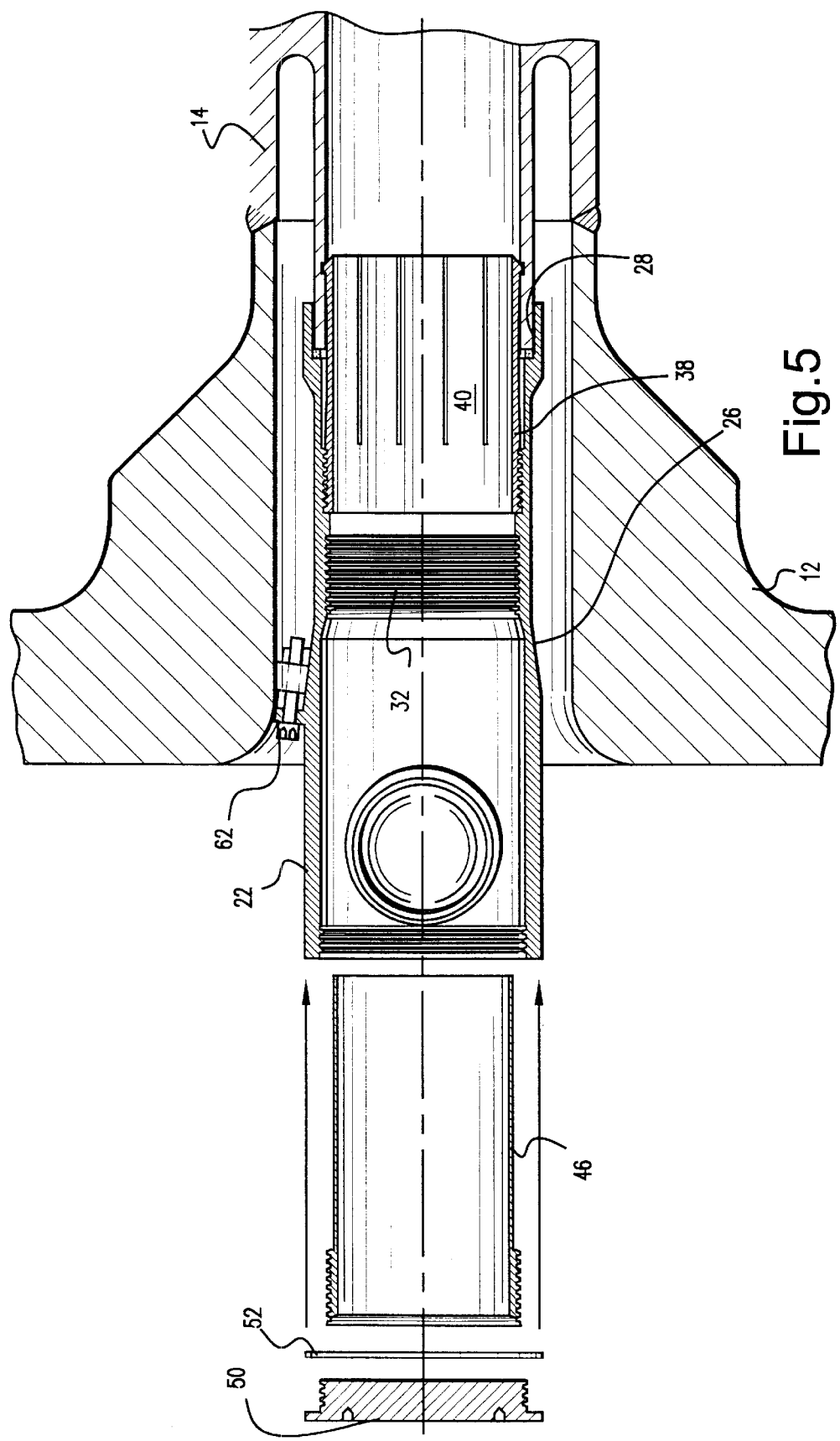

Referring now to FIGS. 2–5, the manner of replacing the extant T-box/thermal sleeve with the T-box/thermal sleeve assembly 16 will now be described. The existing T-box 54 and a portion of the thermal sleeve 56 are first removed as illustrated in FIGS. 2 and 3 from the core spray nozzle by employing conventional underwater electric discharge machining, leaving a remnant end 58 (FIG. 3) of the thermal sleeve. This is accomplished underwater and from within the reactor vessel. The newly cut end portion 58 of the thermal sleeve remnant is then prepared for mating with the replacement T-box/thermal sleeve forging. First, the end of the thermal sleeve remnant 20 is machined flat and perpendicular to the thermal sleeve bore. Additionally, the annular groove 36 is formed by machining along the inside diameter of the thermal sleeve remnant 20 at a specified distance from its end portion 58. As evident, the groove 36 provides the mating connection with the finger flanges 44 of the collet to form the mechanical joint between the thermal sleeve remnant 20 and the replacement T-box/thermal sleeve assembly 16 and which joint is sufficient to withstand axial loading therebetween. Next, the collet 38 is screwthreaded onto the replacement T-box/thermal sleeve assembly. It will be appreciated that the threading action between the collet 38 and the thermal sleeve 26 along threads 30 provides a length adjustability between the collet fingers 40 and the seal interface of the T-box/thermal sleeve end and the thermal sleeve remnant end portion 58. A seal washer, preferably a Belleville spring seal 60, is provided on the end of the replacement thermal sleeve 26 and the entire assembly is inserted from the interior of the vessel wall 12 into the nozzle bore 15 such that the counterbore 28 of the replace ment thermal sleeve 26 receives the thermal sleeve remnant end portion 58. The Belleville spring washer 60 lies between the opposing end faces of the thermal sleeve remnant 20 and replacement thermal sleeve 26. Also, as the replacement thermal sleeve 26 is inserted to receive the end portion 58 of the thermal sleeve remnant 20, the flanges 44 of the fingers 40 engage in the groove 36 to mechanically retain the parts in assembly. The Belleville spring washer 60 provides compression loading on portions of each of the thermal sleeve remnant 20 and replacement thermal sleeve 26.

To retain the replacement thermal sleeve 26 and thermal sleeve remnant 20 mechanically engaged one with the other, the retention sleeve 46 is inserted through the open end of the T-box and threaded along the threads 32 of the replacement thermal sleeve 26. It will be appreciated that the opposite end of the retention sleeve advances and radially overlies the internal surfaces of the fingers 40 whereby the flanges 44 of the fingers are maintained in the groove 36. The ends of the fingers 40 are tapered to facilitate their axial insertion through the end of the thermal sleeve remnant 20. Thus, the fingers 40 are initially biased radially inwardly for passage along the interior surface of the thermal sleeve remnant 20 and are then resiliently flexed radially outwardly to engage the flanges 44 in the groove 36. The retention sleeve is rotated into position by using a spanner wrench or other suitable tool and is then locked against rotation, for example, by staking to the replacement thermal sleeve 26, to prevent inadvertent rotation and possible removal.

The T-box/thermal sleeve replacement assembly 16 is supported within the nozzle bore by three or four equally spaced adjustable wedge blocks 62. Each wedge block 62 comprises a keeper 64, a wedge 66 and a jack screw 68. By suitably adjusting the jack screws driving the wedges, the inserted assembly can be centered vis-a-vis the thermal sleeve remnant 20. Thus, the wedge blocks maintain axial alignment of the assembly with the thermal sleeve and minimize bending stresses of the collet fingers. Also, by using the wedge blocks 62, field measuring or machining is not necessary to ensure proper fit-up in the core spray nozzle 10. Finally, the end cap 50 is threaded onto the open end of the T-box. Another Belleville seal ring 52 is preferably disposed between the cap and the T-box. An anti-rotation feature may be incorporated between the closure end cap 50 and the T-box 22 to prevent loosening of the closure cap 50.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a nuclear reactor having a reactor vessel wall and a nozzle penetrating the wall for delivering a fluid into the reactor, the nozzle including an end portion of a sleeve within the nozzle and having a groove, a connection with piping internal to said reactor vessel, comprising:

a thermal sleeve extending from within the reactor vessel wall and having an end adjoining said sleeve end portion within said nozzle;

a generally cylindrical collet having a plurality of circumferentially spaced fingers with radially directed flanges adjacent one end thereof, said flanges engaging in said groove;

said collet being connected to said thermal sleeve adjacent an end thereof opposite said one collet end; and a retention sleeve secured to said thermal sleeve and extending about said fingers to retain said flanges in said groove.

2. A connection according to claim 1 wherein said thermal sleeve terminates on the interior of said vessel wall in a T-connection.

3. A connection according to claim 1 wherein said groove lies along a radially interior surface of said sleeve end portion, said flanges of said collet projecting generally radially outwardly for engagement in said groove.

4. A connection according to claim 3 wherein said collet and said thermal sleeve are screwthreaded to one another at said opposite end of said collet.

5. A connection according to claim 3 wherein said retention sleeve overlies said fingers on radially inward sides thereof, said retention sleeve being screwthreaded to said thermal sleeve.

6. A connection according to claim 1 including a sealing washer between said sleeve end portion and said thermal sleeve end adjoining said sleeve end portion.

7. A connection according to claim 1 wherein said groove lies along a radially interior surface of said sleeve end portion, said flanges of said collet projecting generally radially outwardly for engagement in said groove, said collet and said thermal sleeve being screwthreaded to one another at said opposite end of said collet, said retention sleeve overlying said fingers on radially inward sides thereof, said retention sleeve being screwthreaded to said thermal sleeve, and a sealing washer between said sleeve end portion and said thermal sleeve end adjoining said sleeve end portion.

8. A connection according to claim 1 including a plurality of adjustable wedge blocks between said thermal sleeve and an interior wall surface of said nozzle for supporting said thermal sleeve, retention sleeve and collet within said nozzle.

* * * * *